Figure 4:
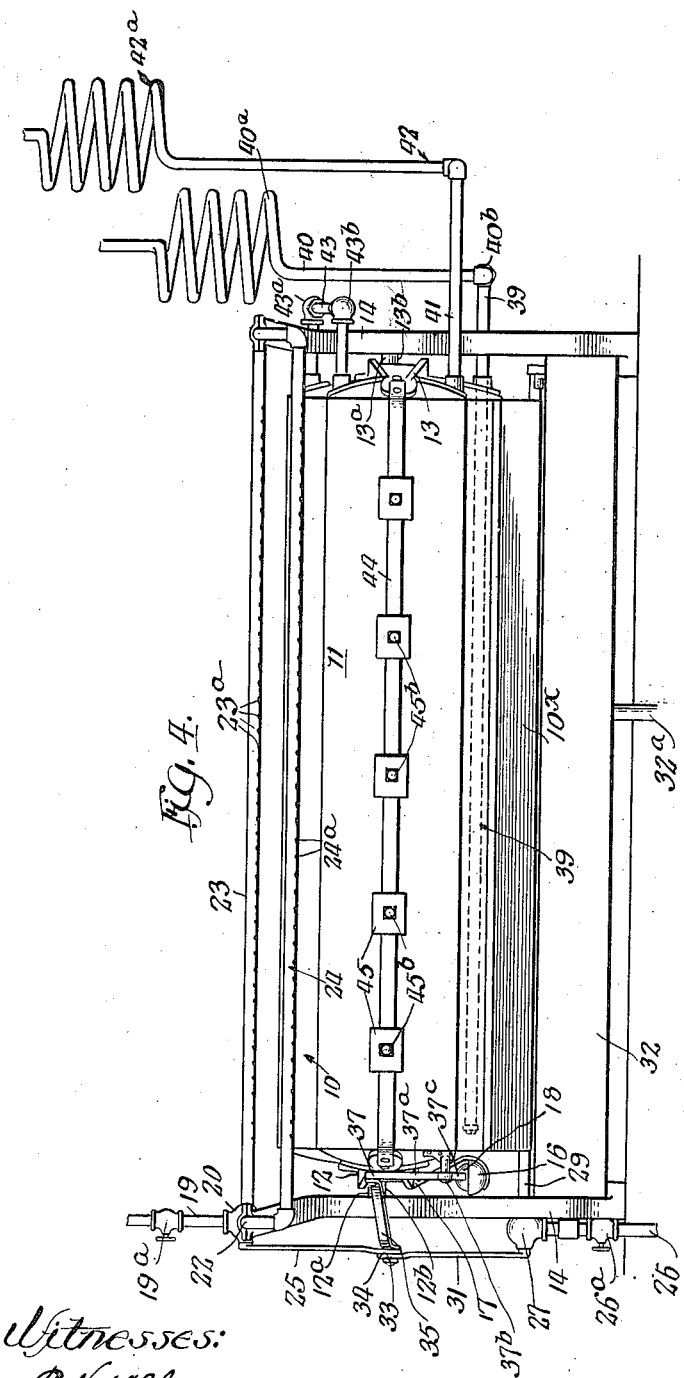

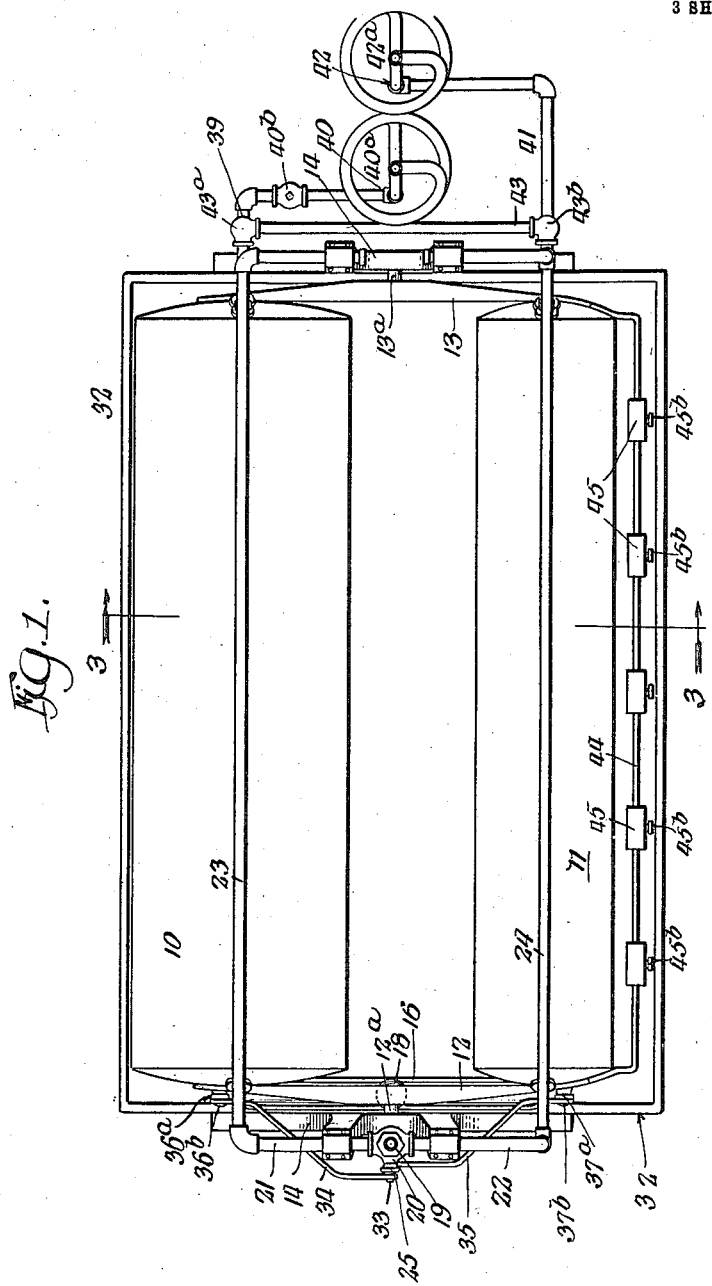

H. H. SOUTHWORTH & F. W. WOLF, Jr.
REFRIGERATING APPARATUS.
APPLICATION FILED OCT. 17, 1910.
1,070,074.
Patented Aug. 12, 1913.
3 SHEETS—SHEET 2.
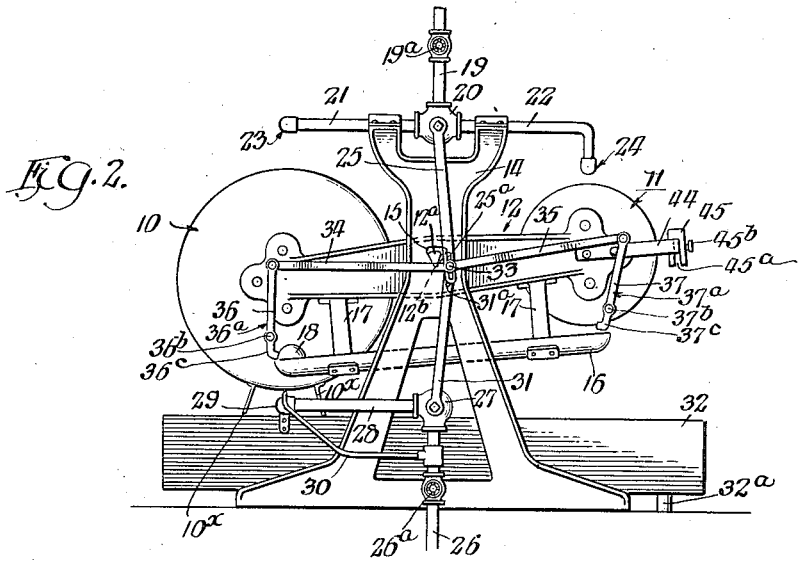
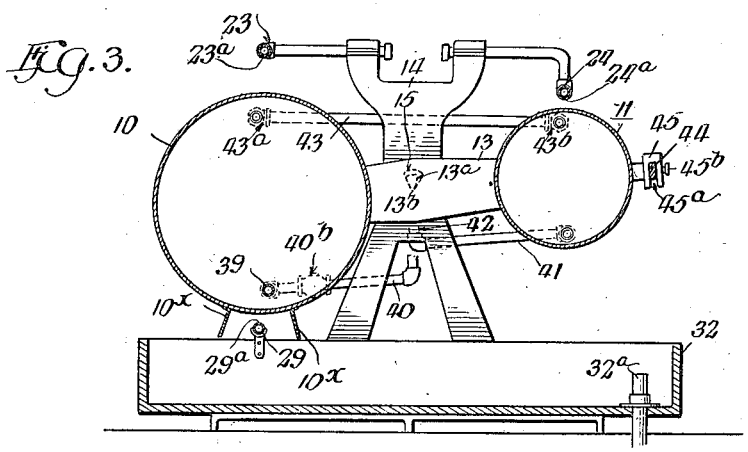
Witnesses:
Inventors:
Fred W. Wolf Jr.
Harrison H. Southworth
by Poole & Brown, Attys H. H. SOUTHWORTH & F. W. WOLF, Jr.
REFRIGERATING APPARATUS.
APPLICATION FILED OCT. 17, 1910.

1,070,074.

Patented Aug. 12, 1913.
3 SHEETS—SHEET 3.

Witnesses:
T. N. Alfred
H. R. Wilkins

Inventors.
Fred W. Wolf Jr.
Harrison H. Southworth
by Poole & Brown
Attys

UNITED STATES PATENT OFFICE.

HARRISON H. SOUTHWORTH AND FRED W. WOLF, JR., OF CHICAGO, ILLINOIS, ASSIGNORS TO ICELESS REFRIGERATOR COMPANY, OF CHICAGO, ILLINOIS, A CORPORATION OF ILLINOIS.

REFRIGERATING APPARATUS.

1,070,074.  Specification of Letters Patent.  Patented Aug. 12, 1913.

Application filed October 17, 1910. Serial No. 587,487.

*To all whom it may concern:*

Be it known that we, HARRISON H. SOUTHWORTH and FRED W. WOLF, Jr., citizens of the United States, and residents of Chicago, in the county of Cook and State of Illinois, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to improvements in refrigerating apparatus and particularly to refrigerating apparatus of the absorption type.

The invention is shown herein as applied to an apparatus of the intermittent absorption type. A refrigerating apparatus of this kind includes a generator-absorber containing liquor which during certain periods of time receives and absorbs ammonia gas delivered to it from the refrigerating coils, this action continuing until it has become substantially saturated with the ammonia gas, and during alternate periods of time, said generator-absorber gives off ammonia gas under pressure which is passed through a condenser and then delivered in liquid form to a receiver. From the receiver the liquid ammonia is conveyed through an expansion valve beyond which it expands as a gas through the refrigerating coils whence it is returned to the generator-absorber. During the first mentioned period the generator-absorber is subjected to the action of cooling water or other cooling means while during the second named period said generator-absorber is heated, usually by gas, so as to drive off the ammonia gas from the saturated or strong liquor. The application of heat is continued until substantially all the ammonia gas is driven off, leaving weak liquor in the drum. The generator-absorber is then ready to absorb ammonia gas again. The apparatus thus necessarily includes cooling and heating means adapted to alternately cool and heat the generator-absorber. The control of this heating and cooling means has heretofore required manual operation and the present invention relates to a novel construction and arrangement of the apparatus whereby the cooling and heating means are controlled automatically.

In an intermittent absorption apparatus wherein the ammonia gas is driven from the generator-absorber and is delivered to the receiver as liquid ammonia intermittently, it is apparent that the weight of liquid ammonia in the receiver will alternately increase to a maximum and decrease to a minimum, approaching the maximum during the period when the generator-absorber is giving off ammonia gas, and approaching the minimum during the period when the generator-absorber is absorbing gas. The maximum is reached when substantially all the ammonia gas has been driven from the generator-absorber and the minimum is reached when the liquor in the generator-absorber has become substantially saturated with ammonia gas. That is to say, the maximum and minimum weights of liquid ammonia in the receiver occur substantially at the periods of time when it is necessary to alternately apply the cooling and heating means to the generator-absorber. In carrying out our invention we make use of this varying weight of the receiver and provide mechanism whereby the variation in weight of said receiver will effect the control of the alternate application of the cooling and heating means to the generator-absorber. To this end we mount the receiver in such manner that it is movable vertically and connect it with a counter-balance which is adapted to over-balance and raise the said receiver when the liquid ammonia contained therein has reached a minimum and which is adapted to be over-balanced by said receiver so as to permit the latter to descend when the liquid ammonia contained therein has reached a maximum. We then provide mechanism for controlling the means for alternately cooling and heating the generator-absorber which is actuated by the rising and falling movement of the receiver.

The invention consists of the matters hereinafter described and more particularly pointed out in the appended claims.

Figure 5:
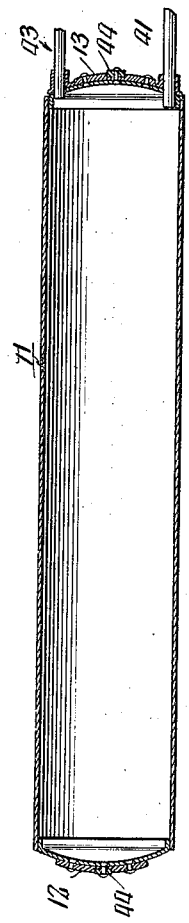

In the drawings: Figure 1 is a top plan view of our improved apparatus. Fig. 2 is a front elevation of the same. Fig. 3 is a vertical cross-section through the apparatus, on the line 3—3 of Fig. 1. Fig. 4 is a side elevation of the apparatus. Fig. 5 is a longitudinal section through the condensing and receiving drum.

In that embodiment of our invention illustrated in the drawings, 10 indicates a drum constituting a generator-absorber and 11 a receiving and condensing drum. For convenience and economy we have, in the present example, combined the condenser and receiver in one drum, but this is not essential and a separate condenser may be used. We shall therefore refer to the drum 11 as the receiver, since, as will appear, it is due to its function as a receiver that said drum is of importance in the operation of the apparatus. Said drums may be of any usual or convenient construction adapted for use in connection with a refrigerating apparatus, the receiver drum being the smaller drum of the two. They are rigidly connected at their ends by means of plates 12, 13, the drums and plates together constituting a rocking frame which is mounted on upright standards 14, 14 located, respectively, at the front and rear ends of said drums.

12$^a$, 13$^a$ indicate studs projecting, respectively, from the plates 12 and 13. Said studs are V-shaped in cross-section, having knife-edges 12$^b$, 13$^b$ which have bearing in angular slots 15, 15 formed in the standards 14, 14. The angle of the slots is greater than that of the V-shaped studs so as to permit the frame to have a certain amplitude of oscillation, said oscillation being limited by the engagement of the sides of the V-shaped studs with the sides of the angular slots.

16 is a trough-like runway parallel to the plane through the central axes of the drums 10 and 11, and rigidly connected with the frame of which said drums are a part. Said runway is secured by means of hangers 17, 17 to the rocking frame, said hangers being shown in the drawings as bolted to the plate 12. The runway forms a track for a ball 18 and is closed at its ends to limit the movement of said ball.

19 is a main water supply pipe connected by a T-joint 20 to branch pipes 21, 22 which in turn connect with pipes 23 and 24 located vertically above the drums 10 and 11 extending longitudinally of and parallel to said drums. The branch pipes 21, 22 are suitably supported on the front standard 14, while the rear ends of the pipes 23 and 24 are supported by the rear standard 14. Both of said pipes are provided with perforations 23$^a$, 24$^a$ on their under sides through which water is adapted to be discharged on the top and sides of the associated drum.

25 is a lever which operates a two-way cock in the T-joint 20 and which is adapted to shift the cooling water from the pipe 23 to the pipe 24 and then back again. The main water supply is controlled by a hand valve 19$^a$.

26 is a gas supply pipe which is connected by an elbow 27 to a pipe 28 which is in turn connected to a longitudinally extending burner pipe 29 located under the drum 10 and arranged parallel to said drum. Said pipe 29 is provided with suitable burner openings 29$^a$, and the burner is adapted to be lighted from a pilot burner 30 fed from the main supply pipe 26.

26$^a$ is a hand valve which controls the gas supply.

31 is a lever which operates the cock in the elbow 26 to turn on and turn off the supply of gas for the burner 29.

32 is a trough located under the drums to receive the cooling water after it is passed over the drums. The water is led from said trough by a pipe 32$^a$ to any suitable place of disposal. The gas burner pipe 29, as shown in said drawings, is supported on said trough. To protect said burner pipe from the water flowing from the drum 10, deflecting vanes 10$^x$ 10$^x$ are secured to the bottom of said drum.

The levers 25 and 31 are provided near their free ends, which are adjacent, with slots 25$^a$, 31$^a$. Through said slots extends a transverse pin 33 to which are pivotally connected the ends of oppositely extending links 34 and 35, which have their other ends suitably connected to arms 36 and 37 of rocking levers 36$^a$, 37$^a$. Said levers are pivotally mounted on the ends of the drum by means of studs 36$^b$, 37$^b$ fixed to the ends of said drums. The lower shorter arms 36$^c$, 37$^c$ of said levers are provided with angular extensions which are adapted to be struck by the ball 18 in the operation of the apparatus as will be presently described.

The generator-absorber drum 10 is provided with a lower intake pipe 39 extending longitudinally through the drum to a point near its forward end and perforated within the drum to permit the escape of ammonia gas therein. Said pipe is connected to a pipe 40 which leads from the refrigerating coils in the usual manner and is adapted to supply the expanded gas after it has done its work in the refrigerator coils to the generator-absorber drum. Said pipe 40 includes a flexible coil 40$^a$ which is inserted so that the connection of the tank with said pipe will not prevent a free oscillation of the rocking frame.

41 is a discharge pipe connected to the rear end of the receiver drum 11 near its bottom. Said pipe 41 is connected to a pipe 42 which leads through an expansion valve (not shown) to the refrigerating coils in the usual manner. Said pipe also includes a flexible coil 42$^a$ for the same purpose as that of the coil 40$^a$.

The drums 10 and 11 are connected by a pipe 43 which enters each of said drums near the top of the drum. A check-valve 40$^b$ is located in the pipe 40 to prevent the flow of liquor or ammonia gas from the drum 10 toward the refrigerating coils when the pressure in said drum rises by reason of the application of heat to drive the ammonia gas into the receiver 11. Check-valves 43ª and 43ᵇ are located in the pipe 43 to control the flow of ammonia gas between the generator-absorber drum and the receiver in the usual manner. On account of the greater weight of the drum 10 owing to its larger dimensions and also to the fact that it always contains water, the drum 11 is provided with equalizing weights. Said weights are mounted on a bar which is connected to the drum 11.

44 indicates the bar and 45, weights secured to said bar. Said weights are provided with grooves 45ª within which the bar fits and are held in place on the bar by set-screws 45ᵇ.

The operation of the apparatus is as follows: Consider the parts in the relation illustrated in the drawings in which the generator-absorber drum 10 is shown in a depressed position and the receiver drum 11 in an elevated position. The lever 31 is turned so that the cock in the elbow 27 is open, and gas is being supplied to the pipe 29 under the drum 10 to heat the same. The lever 25 is in such position that the two-way cock in the T-joint 20 is turned to direct the water into the cooling pipe 24 above the receiver drum 11 to cool said drum. Under these conditions the drum 10 contains strong liquor, and ammonia gas is being driven by the heat from the burners through the pipe 43 into the receiver 11 wherein it is condensed into liquid form. As the liquid ammonia collects in the receiver drum 11 it increases the weight of said drum and causes it eventually to overbalance the combined weight of the generator-absorber drum 10 and the ball 18, said generator-absorber drum having in the meantime been losing weight owing to the fact that ammonia gas has been driven from it. When the drum 11 has received enough liquid ammonia to overbalance the drum 10 and the ball 18, the frame comprising said drums is shifted on its axis, the receiver drum 11 descending and the generator-absorber drum 10 rising. This movement inclines the trough or runway 16 in the opposite direction to that in which it is shown in the drawings, thus causing the ball 18 to roll toward the right. Just as the ball 18 reaches the end of its path of travel and at the very instant that it is traveling at its highest speed, it strikes the angular end of the short arm 37ᶜ of the lever 37ª and rocks said lever on its stud 37ᵇ, thereby swinging the arm 37 of said lever to the left, which, through the link 35, shifts the levers 31 and 25. This movement of the lever 31 cuts off the gas supply to the pipe 29 while the like movement of the lever 25 shifts the two-way cock in the T-joint 20 to divert the cooling water from the pipe 24 to the pipe 23. The drum 10 is now in condition to absorb ammonia gas as it contains weak liquor and is being cooled by the water flowing from the pipe 23. The ammonia gas flowing from the refrigerating coils through the pipe 40 now enters through the pipe 39 into the drum 10 wherein it is absorbed by the weak liquor. Liquid ammonia is discharged from the receiver 11 through the pipe 41 and the weight of liquid ammonia therein gradually diminishes. This operation continues until the weight of the receiver, together with that of the ball 18, no longer overweighs the generator-absorber drum 10, which in the meantime has been increasing in weight due to its absorption of ammonia gas, whereupon the frame shifts on its axis back to the position shown in the drawings; the ball 18 rolls down its trough, now inclined toward the left, and strikes the angular detent 36ᶜ of the rocking lever 36ª, so as to rock said lever which, through the link 34, shifts the levers 31 and 25 so as to return the cocks operated by said levers to the first position, with the cooling water flowing over the receiver 11 and the gas burning under the generator-absorber drum 10. The operation then continues as before. The ball should be of sufficient weight to perform its function of throwing the levers to operate the cocks and also to nearly equal the difference between the weight of the receiver tank when it contains the minimum amount of liquid ammonia and its weight when it contains the maximum amount of liquid ammonia, said difference being equal to the weight of ammonia gas driven from the generator-absorber drum to the receiver during the periods when said drum is being heated. The knife-edge bearings forming the fulcrums of the rocking frame are used so that the slightest movement of the frame will put it in unstable equilibrium, whereupon the ball will roll toward the heavier drum and shift the frame in that direction.

It will be apparent that the operation of the apparatus is entirely automatic and requires no attention whatever after it has once been started.

The apparatus is of particular advantage for use in connection with small refrigerators where the employment of an attendant to give the requisite constant attention to the apparatus is not justified by economy.

While we have shown as a preferred embodiment of our invention an apparatus in which the generator-absorber drum is used as a counterbalance for the receiver drum in order to produce the necessary rising and falling movement of said receiver drum, we do not wish to be limited to this construction as it is apparent that the apparatus may be modified in that and in other ways and that the mechanical details of construction may be changed or varied to a large extent without departing from the spirit of our invention and we do not wish to be limited thereby except as pointed out in the appended claims.

We claim as our invention:—

1. In a refrigerating apparatus of the absorption type, including a generator-absorber, means for alternately cooling and heating said generator-absorber, and a liquid ammonia receiver fed from said generator-absorber and in which the weight of liquid ammonia varies, a support for said liquid ammonia receiver, said support being movable vertically, counterbalancing means adapted to overweigh said receiver and raise it when said receiver contains the minimum weight of liquid ammonia, and to be overweighed by said receiver to permit said receiver to descend when it contains a maximum weight of liquid ammonia, and means dependent for its operation upon the varying weight of the contents of the receiver in relation to the weight of the counterbalancing means for controlling said cooling and heating means.

2. In a refrigerating apparatus of the absorption type, including a generator-absorber, means for alternately cooling and heating said generator-absorber, and a liquid ammonia receiver fed from said generator-absorber and in which the weight of liquid ammonia varies, a rocking frame by means of which said liquid ammonia receiver is supported, counterbalancing means also supported by said rocking frame, said counterbalancing means being adapted to overweigh said receiver and raise it when said receiver contains a minimum weight of liquid ammonia, and to be overweighed by said receiver to permit said receiver to descend when it contains a maximum weight of liquid ammonia, and means actuated by said rocking frame for controlling said cooling and heating means.

3. In a refrigerating apparatus of the absorption type, including a generator-absorber, means for alternately cooling and heating said generator-absorber, and a liquid ammonia receiver fed from said generator-absorber and in which the weight of liquid ammonia varies, means for supporting said liquid ammonia receiver and said generator-absorber, so as to oppose the weight of one to that of the other, both said generator-absorber and said liquid ammonia receiver being movable vertically, and means dependent for its operation upon the varying weight of the contents of said receiver relative to the weight of said generator-absorber for controlling said cooling and heating means.

4. In a refrigerating apparatus of the absorption type, including a generator-absorber, means for alternately cooling and heating said generator-absorber, and a liquid ammonia receiver fed from said generator-absorber and in which the weight of liquid ammonia varies, a rocking frame, one end of which carries said liquid ammonia receiver and the other end of which carries said generator-absorber, and means actuated by said rocking frame for controlling said cooling and heating means.

5. In a refrigerating apparatus of the absorption type, including a generator-absorber, a pipe for discharging cooling water on said generator-absorber, means for controlling the supply of water to said pipe, a gas burner for heating said generator-absorber, means for controlling the supply of gas thereto, and a liquid ammonia receiver fed from said generator-absorber in which the weight of liquid ammonia varies, a rocking frame supporting said liquid ammonia receiver at one end and said generator-absorber at the other end, and mechanism intermediate said rocking frame and said water controlling means and said gas controlling means for actuating them to supply cooling water to said pipe and gas to said burner in alternate cycles.

In testimony, that we claim the foregoing as our invention we affix our signatures in the presence of two witnesses, this 5th day of October A. D. 1910.

HARRISON H. SOUTHWORTH.
FRED W. WOLF, Jr.

Witnesses:
CLARENCE E. MEHLHOPE,
T. H. ALFREDS.